US 8,307,871 B2

(12) United States Patent
Di Miceli et al.

(10) Patent No.: US 8,307,871 B2
(45) Date of Patent: Nov. 13, 2012

(54) EXTRUDER WELDING DEVICE

(75) Inventors: Giuseppe Di Miceli, Menziken (CH); Bruno Von Wyl, Kägiswil (CH)

(73) Assignee: Leister Technologies AG, Kagiswil (CH)

( * ) Notice: Subject to any disclaimer, the term of this patent is extended or adjusted under 35 U.S.C. 154(b) by 347 days.

(21) Appl. No.: 12/600,854

(22) PCT Filed: Mar. 7, 2008

(86) PCT No.: PCT/EP2008/001814
§ 371 (c)(1),
(2), (4) Date: Nov. 19, 2009

(87) PCT Pub. No.: WO2008/141685
PCT Pub. Date: Nov. 27, 2008

(65) Prior Publication Data
US 2010/0147465 A1    Jun. 17, 2010

(30) Foreign Application Priority Data
May 22, 2007    (DE) .................... 20 2007 007 282 U

(51) Int. Cl.
*B32B 37/00* (2006.01)
(52) U.S. Cl. ......... 156/497; 156/499; 156/500; 156/579
(58) Field of Classification Search .................... 156/71, 156/82, 497, 499, 574, 579, 500, 501; 425/318; 222/324, 333, 413, 504
See application file for complete search history.

(56) References Cited

U.S. PATENT DOCUMENTS

| 5,005,731 | A | 4/1991 | Koehler et al. |
| 6,230,936 | B1 | 5/2001 | Lasko |
| 6,431,409 | B1 | 8/2002 | Gehde |
| 2006/0057241 | A1 * | 3/2006 | Di Miceli et al. ............. 425/318 |

FOREIGN PATENT DOCUMENTS

| DE | 298 12 550 | 10/1998 |
| DE | 299 15 768 | 10/2000 |
| EP | 0 594 889 | 5/1994 |
| EP | 0 887 116 | 12/1998 |

OTHER PUBLICATIONS

International Search Report for corresponding PCT Application No. PCT/EP2008/001814 mailed, Sep. 15, 2008.
Anonymous, "A range of Leister hand-held and automatic welders from Techspan", Ferret Product News, Online, Dec. 12, 2006, URL: http://www.ferret.com.au/c/Techspan-Group/A-range-of-Leister-hand-held-and-automatic-welders-from-Techspan-n667443>.

* cited by examiner

*Primary Examiner* — James Sells
(74) *Attorney, Agent, or Firm* — Renner, Otto, Boissell & Sklar

(57) ABSTRACT

The invention relates to a hand welding extruder (1) for welding thermoplastic materials by means of a plasticized plastic strand (26) having a plasticization worm unit (24) connected to a drive motor (20) by a gearbox (21), and having a hot air generation device (27) with an external air supply, the plasticizer worm unit, the gearbox, the drive motor, and the hot air generation device being disposed in a common housing. The proposed hand welding extruder has a bar-shaped housing having a front welding segment (7) and a grab handle (8) connected thereto in the longitudinal direction. The plasticizer worm unit and the hot air generation device are disposed in the bar-shaped housing in the welding segment and an electric motor (20) is disposed in the grab handle. The electric motor is connected to a shaft of the extruder worm (23) via a gearbox, the gearbox being potentially provided in the grab handle and/or the welding segment of the bar-shaped housing of the hand weld extruder.

11 Claims, 3 Drawing Sheets

EXTRUDER WELDING DEVICE

TECHNICAL FIELD OF THE INVENTION

The invention relates to a hand welding extruder for welding thermoplastic materials by means of a plasticized plastic strand having a plasticization worm unit connected to a drive motor by a gearbox, and having a hot air generation device with an external air supply, the plasticizer worm unit, the gearbox, the drive motor, and the hot air generation device being disposed in a common housing.

DISCUSSION OF RELATED ART

Such welding devices are known in a wide variety of embodiments. They are used for the so-called extrusion welding, i.e. for surface-to-surface joining of plastic materials. Known extruder welding devices comprise a heatable plasticization worm unit that is supplied with a welding wire consisting of thermoplastic plastic material. The plasticization worm unit heats the welding wire and conveys it to the welding spot as a plasticized plastic strand with an extruder worm via a welding shoe with an exit nozzle at the front end of the plasticization worm unit. At the same time, the plastic materials are heated with hot air in an area around the welding spot in question. For this purpose, the extruder welding device usually has an integrated hot air generation device with its own or an external air supply that heats a supplied flow of cold air and directs, by means of a pre-heating nozzle, a flow of hot air onto the spot of the plastic materials that is to be welded.

The hot air generation device and the plasticization worm unit usually have controllable heating devices that are separate from each other so that the temperatures of the hot air and of the plasticized plastic strand can be controlled independently of each other for optimal welding conditions. The extruder worm of the plasticization worm unit is driven by a rotating drive system. For this purpose, a shaft of the extruder worm is connected with a drive unit with controllable speed whose drive motor drives the extruder worm via a gearbox. The engineering of known extruder welding devices was based on electric hand drills that were augmented by a plasticization worm unit and a hot air generation device. The hot air generation device and the plasticization worm unit are permanently attached to each other and designed as an accessory device for non-permanent attachment to the electric drill.

As a consequence, conventional hand welding extruders are shaped like a typical electric drill, with a drill handle extending laterally from the longitudinal axis of the electric drill and a handle extending laterally from the housing of the accessory device. Both features impede the handling of the welding extruder at welding spots in tight spaces that are difficult to access. Another disadvantage is the great weight of such hand welding extruders, causing fatigue of the operator in case of extended operation. For this reason, it is frequently desirable to use a hand welding extruder of light weight and small size.

An extruder welding device of this type is known from DE 299 15 768 U1. In the device proposed therein, the plasticization worm unit, the hot air generation device, and the drive motor for driving the extruder worm are arranged in a common housing, with an external quasi-stationary control unit being provided for the heating systems of the plasticization worm unit and of the hot air generation device, as well as for the speed of the drive motor. The control unit is non-permanently connected with the hand welding extruder via flexible supply lines. A disadvantage appears to be the integrated fluid motor that is driven by a hydraulic pressure aggregate with an electric hydraulic pump because the hydraulic pressure aggregate is heavy and requires its own, complex control system.

With reference to this prior art, the invention addresses the problem of proposing a hand welding extruder of slender configuration that is lightweight and has an electrical drive system.

SUMMARY OF THE INVENTION

According to the invention, this problem is solved by a hand welding extruder with the characteristics of claim 1. Additional advantageous implementations are given in the dependent claims.

The hand welding extruder according to the invention has a bar-shaped housing with a front welding segment and a grab handle connected thereto in the longitudinal direction. In the bar-shaped housing, the plasticization worm unit and the hot air generation device are located in the welding segment, and an electric motor is located in the grab handle. Via a gearbox, the electric motor is connected with a shaft of the extruder worm, with the gearbox installed either in the grab handle and/or the welding segment of the bar-shaped housing of the hand welding extruder.

In a preferred embodiment of the hand welding extruder, the gearbox is installed in the grab handle so that it is remote from the heating systems of the hot air generation device and/or the plasticization worm unit, thereby minimizing its exposure to the heat generated by these. In addition, the gearbox along with the electric motor may be cooled by means of a flow of air in a conventional way.

Advantageously, the front welding segment and the rear grab handle of the bar-shaped housing have an essentially cylindrical shape. This results in an elongated, slender shape of the hand welding extruder so that it can be used even when space is restricted. It has the additional advantage that this creates a simple and ergonomically favorable shape of the handle whose diameter is essentially determined by the configuration of the electric motor. Also, the cylindrical shape of the tube-shaped welding segment makes it possible to arrange the plasticization worm unit and the hot air generation device inside it in a concentric and therefore space-saving configuration. The hot air generation device may be located next to the plasticization worm unit, or may concentrically overlap the plasticization worm unit on the outside, either completely or partially.

Commonly, the plasticization worm unit and the hot air generation device have different operating temperatures, with the temperature of the plasticization worm unit set to be significantly below that of the hot air generation device. It proved to be advantageous to thermally disconnect the plasticization worm unit and the hot air generation device from each other in order to largely prevent mutual thermal influences. As a consequence, their temperatures can be controlled independently by means of the individual heating systems. In order to achieve the thermal disconnection, either an air gap or some other insulating material may be provided between the plasticization worm unit and the hot air generation device. If an air gap is provided, the insulating effect can be improved by passing a cool flow of air through the air gap.

Due to high temperatures, the welding segment of the welding extruder poses the danger of causing burns. It is therefore of advantage to provide a cooled guard tube on the bar-shaped housing that largely overlaps the welding segment. The guard tube is cooled by the cold flow of air that is blown through an annular gap between the hot housing of the welding segment and the guard tube. The flow of air exits from the grab handle in the direction of the annular gap. The flow of air for cooling the guard tube may be taken from the cold air supply for the hot air generation device. It is also possible to use the air guided past the housing and the electric motor for cooling the same.

In a preferred embodiment of the invention, the hand welding extruder has a mobile welding unit and a quasi-stationary supply unit that are remote from each other and are connected, or can be connected with each other by means of flexible connecting lines. The flexible connecting lines may include electrical supply and control signal lines as well as hose lines. The supply unit is as mobile per se as the welding unit, with the welding unit being movable independently of the supply unit. As a consequence, the supply unit may be stationed in one place for the welding process, i.e. it may be operated in a quasi-stationary mode. This configuration is based on the idea of reducing the weight and the volume of the hand welding extruder as much as possible by separating from each other all components of the hand welding extruder that do not participate directly in the welding process as well as the operating elements that are not directly required for the operation, by creating the supply and welding unit.

The quasi-stationary supply unit for the hand welding extruder is a sturdy device and can be connected by means of the provided connecting lines to existing power and compressed air sources or blowers, or to appropriate supply lines. In order to facilitate the ease of use of the hand welding extruder it is practical to combine the flexible connecting lines in one or several bundles of lines, preferably in a single bundle of lines. This line bundle may also include the supply tube for the plastic strand to be plasticized. The supply lines may be enclosed in a common sleeve, or may be held together by individual connectors.

Preference is given to an embodiment where the flexible connecting lines, for example a hose line for the air supply and electrical connecting lines contained therein, are connected to the welding unit and/or the supply unit by means of a rotatable connector. This has the effect that the welding unit can simply be rotated in circumferential direction relative to the supply unit without the connecting lines twisting in a spiral, thereby impeding the handling of the welding unit, especially when welding in inaccessible spaces.

Preferably, the supply unit of the hand welding extruder according to the invention has control and/or adjustment devices for the supply of the plasticization worm unit and/or the hot air generation device and/or the electric motor, with connections for the connecting lines between the welding unit and the supply unit being provided in the extension of the grab handle of the welding unit on the bar-shaped housing. This further enhances the slender cylindrical configuration of the welding unit so that the hand welding extruder is especially well suited for extrusion welding in tight and therefore difficult to access welding spots.

In one embodiment of the hand welding extruder according to the invention, the supply unit has control elements and/or display elements for setting or visually displaying the speed of the electric motor and/or the temperature of the plasticized plastic strand and/or the temperature of the hot air and/or the air supply to the hot air generation device. Preferably, the control elements and the display elements are digital in order to permit a precise control and display, although analog embodiments are not excluded.

The control elements permit the error-free adjustment of the welding parameters for the hand welding extruder. Beside the control and display elements on the supply unit, additional control and display elements may be provided on the grab handle of the hand welding extruder that also act on the control and/or adjustment devices of the supply unit. They may be provided in addition to, and therefore parallel to the control and/or display elements of the supply unit. By means of these elements, during the operation of the hand welding extruder, the operator is able to directly monitor and/or slightly change important parameters of the welding process without having to interrupt the welding process.

In an advantageous embodiment of the hand welding extruder, the grab handle—preferably at a rear end—has at least one connection for the air supply and/or the energy supply, as well as at least one operating element, in the form of a switch or selector, for the electric motor and/or the heating systems of the hand welding extruder. The operating element located directly on the grab handle makes it possible to briefly interrupt and then resume the welding process with the hand welding extruder. In addition, connections for control sensors integrated in the bar-shaped housing as well as for a supply line for the plastic strand may be provided on the grab handle.

As drive system for the plasticization worm unit, an electronic drive unit with an electric motor is provided whose speed can be controlled. On the one hand, this allows for a compact configuration with a good volume-to-performance ratio and, on the other hand, provides for an essentially constant torque that is selectable, with the electric motor being rated for continuous operation at high temperatures.

Below, the invention is explained in detail with reference to two embodiments shown in the drawing. Additional characteristics of the invention follow from the description below of the embodiments of the invention in conjunction with the claims and the attached drawing. The individual characteristics of the invention may be implemented either by themselves or in combinations of several in different embodiments of the invention.

DETAILED DESCRIPTION OF THE INVENTION

Figure 1:
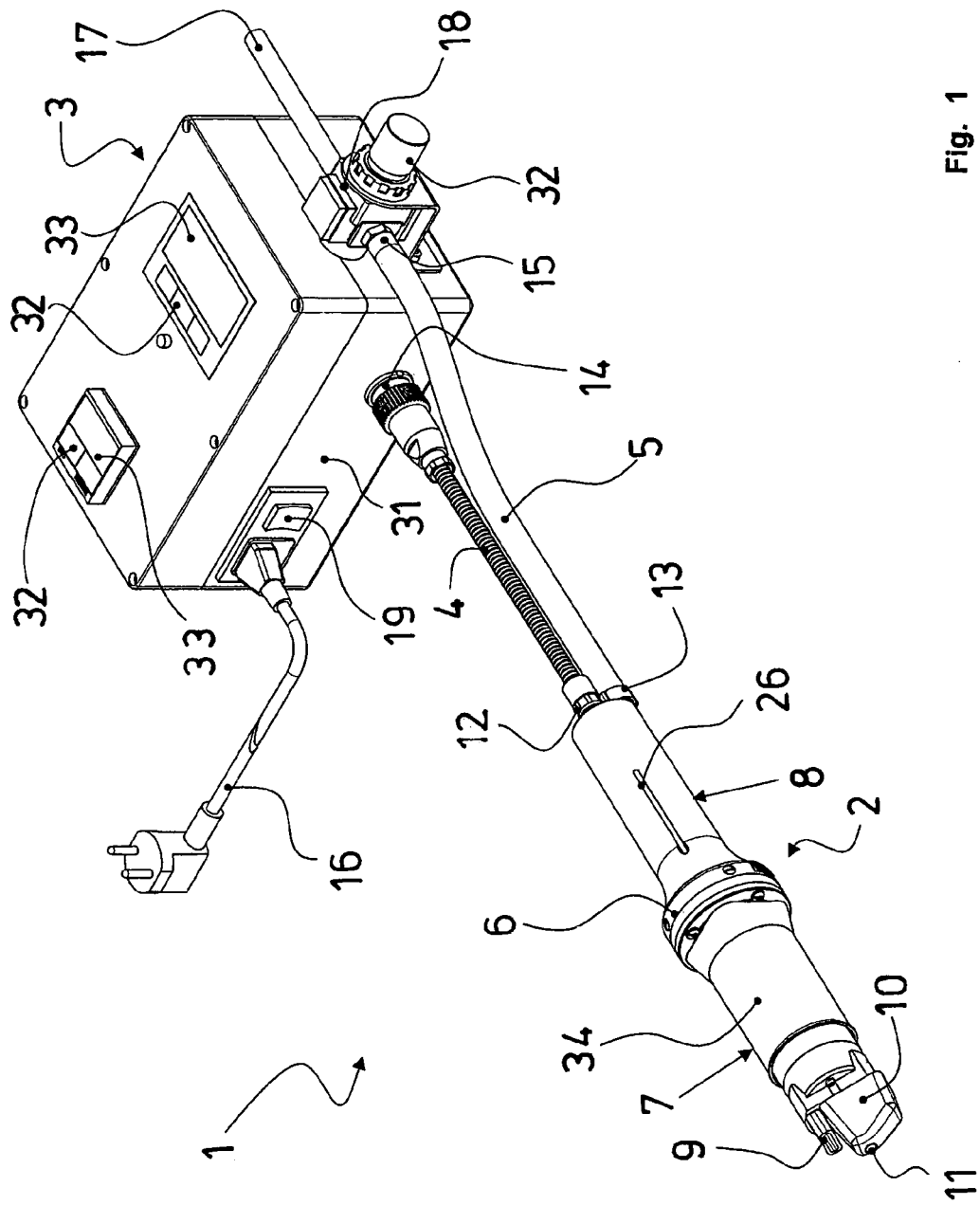
FIG. 1 shows a perspective view of a first hand welding extruder according to the invention with a rigid connector.

FIG. 1 shows a hand welding extruder 1 according to the invention with a supply unit 3 that is separated from the welding unit 2, with the welding unit 2 and the supply unit 3 being connected non-permanently to each other via flexible connecting lines 4, 5. The connecting line 4 supplies the welding unit 2 with electric energy and the connecting line 5 supplies compressed cold air to the welding unit 2. The welding unit 2 has a bar-shaped, essentially cylindrical housing 6 with a front welding segment 7 and a rear grab handle 8. In addition, a handle extending laterally from the housing 6, as known from other apparatus, may be provided.

A pre-heating nozzle 9 for supplying hot air, and also a welding shoe 10 with an exit nozzle 11 for a plasticized plastic strand (not shown in the drawing) are located at a front end of the front welding segment 7. In addition, at a rear end of the grab handle 8 that is associated with the supply unit 3, the connections 12, 13 for the supply lines 4, 5 are provided. The supply unit 3 has matching connections 14, 15. Also, the welding unit 2 has a cooled guard tube 34 that overlaps the welding segment 7 and is cooled by means of the supplied cold air that flows in the longitudinal direction through the air gap 35 located therebetween.

By means of the supply unit 3, the welding unit 2 is supplied with electric power and cold air. For this purpose, the supply unit 3 can be connected by means of an electric power cord 16 and an air supply hose 17 to a voltage source and to a compressed air source or a blower for cold air (not shown in FIG. 1). The cold air dispensed by the compressed air source enters the welding unit 2 via a control valve 18. The control valve 18 serves to adjust the air throughput through the welding unit 2 through the adjustment of the overpressure of the air supply. In addition, the supply unit 3 has an electrical on-off switch 19 for the supplied line voltage.

Figures 2, 3:
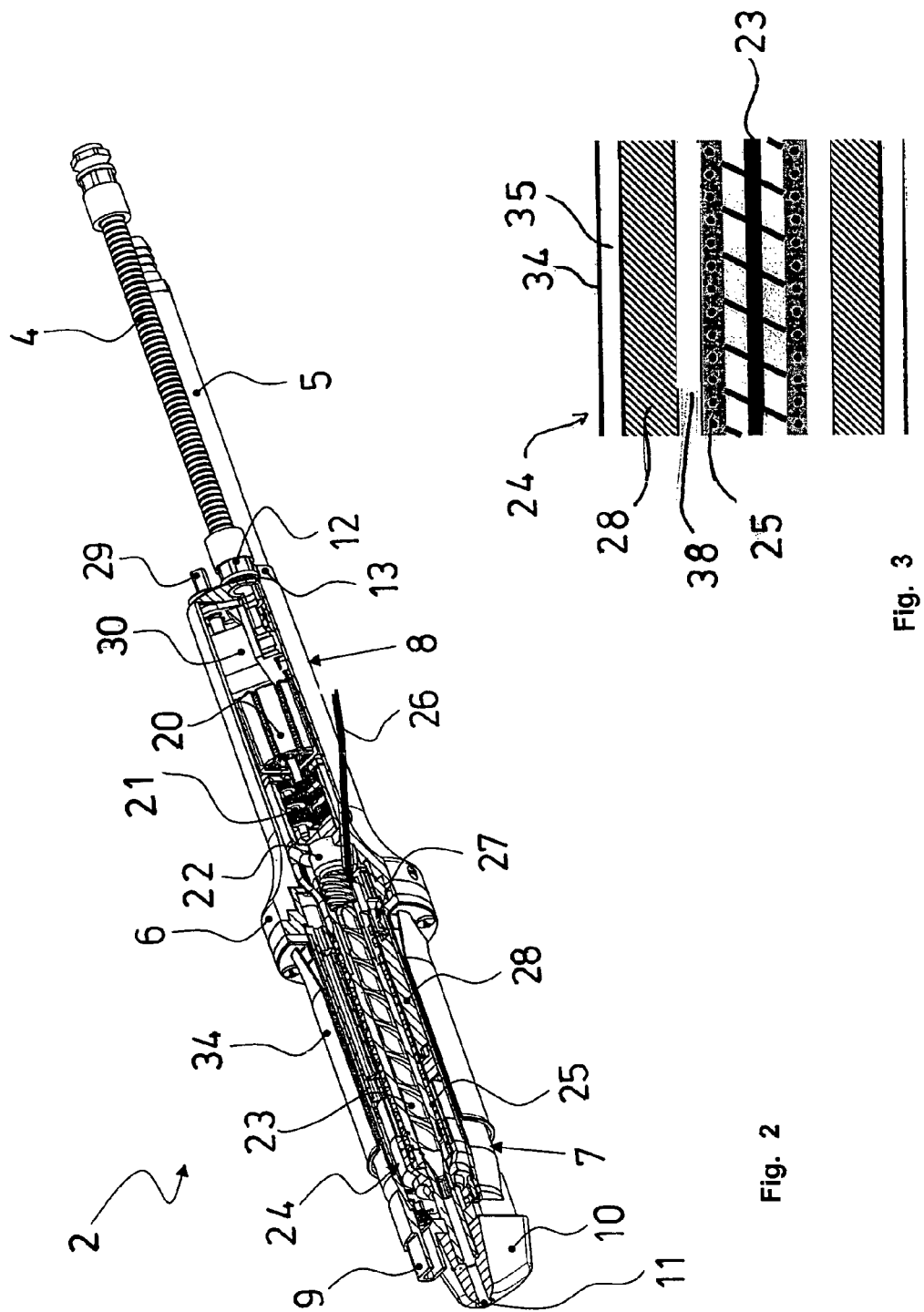
FIG. 2 shows a sectional view of the welding unit of the hand welding extruder from FIG. 1.
FIG. 3 shows an enlarged detail of the front welding segment of the welding unit of the hand welding extruder from FIG. 1.

FIG. 2 shows a sectional view of the welding unit 2. An electric motor 20 and a gearbox 21 are located in the grab handle 8. Via a the gearbox 21, the electric motor 20 is connected to a shaft 22 of an extruder screw 23 that is part of the plasticization worm unit 24. The plasticization worm unit 24 is heated with a coil heating system 25. During the welding process, a plastic strand 26 is pulled into the plasticization worm unit 24 where it is plasticized and is then extruded by the extruder worm 23 at the welding shoe 10 via the exit nozzle 11.

The cylindrical welding segment 7 also has a hot air generation device 27 with a heating element 28 for generating hot air. The hot air generation device 27 is supplied by an external source with compressed cold air that is supplied by the supply unit 3 via the control valve 18. Via the air connection 13, the cold air enters the grab handle 8 of the housing 2 and is then guided past the electric motor 20 and the gearbox 21 for the purpose of cooling said motor and gearbox, until it reaches the welding segment 7. In the welding segment 7, a portion of the compressed cold air enters the hot air generation device 27 where, heated by the heating element 28, it exits as a flow of hot air at the pre-heating nozzle 9. The remaining portion enters the air gap 35 referred to above for the purpose of cooling the guard tube 34.

Beside the compressed air connection 13 for the cold air and the electrical connection 12 for the energy supply of the coil heating system 25, of the heating element 28, and of the electric motor 20, a switch/adjuster 29 as operating element for switching on and off and for regulating the speed of the electric motor 20 is provided. In addition, an electronic circuit 30 is located in the grab handle that monitors and/or controls the correct function of the welding unit 2. The plasticization worm unit 24 and the hot air generation device 27 are thermally disconnected from each other by an air gap 38, as can be seen in FIG. 3. This makes it possible to control the temperatures of the heating systems 25, 28 of the plasticization worm unit 24 and of the hot air generation device 27 largely independently of each other. Also, a thermal influence of the hot air generation device 27 on the plasticization worm unit 24 after the hand welding extruder 1 is switched off is largely excluded.

In a box-shaped housing 31, the supply unit 3 shown in FIG. 1 has control/adjustment devices (not shown in the drawing) for the temperatures of the plasticized plastic strand and of the generated hot air, as well as for the quantity of the plastic strand to be conveyed. For this purpose, appropriate sensors (not shown) are installed in the housing 6 of the welding unit 2. In order to set the nominal values, adjustment elements 32 for setting the speed of the electric motor 20 and for setting the temperatures of the heating systems 25, 28, of the plasticization worm unit 24, and of the hot air generation device 27 are provided on the housing 31. The adjustment elements 32 may be coupled with associated display elements 33 of the housing 31.

Figure 4:
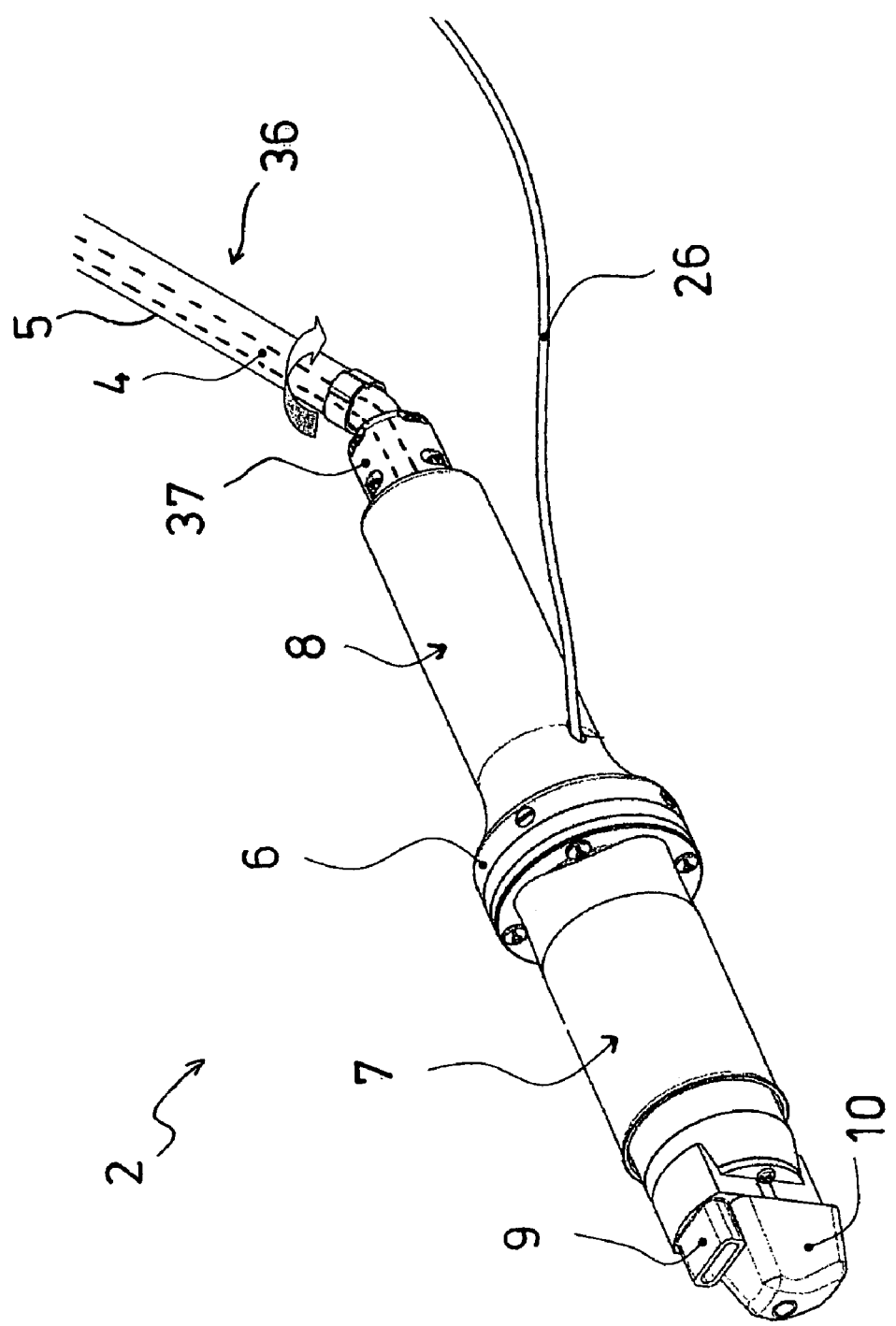
FIG. 4 shows a perspective view of a second hand welding extruder according to the invention with a rotatable connector.

The hand welding extruder 1 according to the invention shown in FIG. 4 differs from the hand welding extruder 1 shown in FIG. 1 essentially in that the flexible connecting lines 4, 5 to the supply unit 3 (not shown in FIG. 4) are configured as a flexible line bundle 36. The electrical connecting line 4 is located inside the connecting line 5 for the external air supply. The line bundle 36, with the hose line 5 serving as sleeve, is rotatably connected to the grab handle 8 of the welding unit 2 by means of a rotatable connector 37. In accordance with the first emb, the end (not shown in the drawing) of the line bundle 36 that is associated with the supply unit 3 may have separate air and electrical connections 14, 15, or a joint connection in which the connections 14, 15 are arranged preferably coaxially with each other.

The invention claimed is:

1. A hand welding extruder for welding thermoplastic materials by means of a plasticized plastic strand having:
   a plasticization worm unit connected to a drive motor by a gearbox; and
   a hot air generation device with an external air supply,
   wherein the plasticizer worm unit, the gearbox, the drive motor, and the hot air generation device are disposed in a common housing,
   the common housing includes a bar-shaped housing having a front welding segment and a grab handle connected thereto in the longitudinal direction,
   the hot air generation device is disposed in the welding segment together with the plasticization worm unit, and the drive motor is disposed in the grab handle, and
   the hand welding extruder has a mobile welding unit and a quasi-stationary supply unit that are disposed remotely from each other and are connected, or are connectible, to each other by means of flexible connecting lines that are connected to the welding unit and/or the supply unit by means of a rotatable connector.

2. The hand welding extruder according to claim 1, wherein the gearbox is located in the grab handle.

3. The hand welding extruder according to claim 1, wherein the front welding segment and the rear grab handle of the bar-shaped housing have an essentially cylindrical shape.

4. The hand welding extruder according to claim 3, wherein the plasticization worm unit and the hot air generation device are thermally disconnected therebetween.

5. The hand welding extruder according to claim 1, wherein a cooled guard tube is located on the welding segment in an overlapping configuration.

6. The hand welding extruder according to claim 1, wherein the supply unit has control and/or adjustment devices for the supply of the plasticization worm unit and/or the hot air generation device and/or the electric motor, with the connections for the connecting lines being provided in the extension of the grab handle of the welding unit on the bar-shaped housing.

7. The hand welding extruder according to claim 1, wherein the connecting lines are combined in one or several line bundles.

8. The hand welding extruder according to claim 1, wherein the supply unit has adjustment elements and/or display elements for the setting and/or the visual display of the speed of the electric motor and/or the temperature of the plasticized plastic strand and/or the air supply of the hot air generation device, such elements being preferably of a digital type.

9. The hand welding extruder according to claim 1, wherein the grab handle has at least one connection for the air and/or energy supply, as well as at least one operating element for the electric motor and/or the heating systems of the hand welding extruder.

10. The hand welding extruder according to claim 4, wherein the plasticization worm unit and the hot air generation device are thermally disconnected by an air gap therebetween.

11. The hand welding extruder according to claim 7, wherein the connecting lines are combined in a single line bundle.

* * * * *